United States Patent
Ouyang et al.

(10) Patent No.: US 7,085,320 B2
(45) Date of Patent: Aug. 1, 2006

(54) MULTIPLE FORMAT VIDEO COMPRESSION

(75) Inventors: He Ouyang, Cupertino, CA (US); Li Sha, San Jose, CA (US); Shuhua Xiang, Fremont, CA (US); Yaojun Luo, San Jose, CA (US); Weimin Zeng, San Jose, CA (US); Jun Ding, San Jose, CA (US)

(73) Assignee: WIS Technologies, Inc., Santa Clara, CA (US)

( * ) Notice: Subject to any disclaimer, the term of this patent is extended or adjusted under 35 U.S.C. 154(b) by 581 days.

(21) Appl. No.: 09/953,053

(22) Filed: Sep. 14, 2001

(65) Prior Publication Data

US 2005/0226324 A1    Oct. 13, 2005

Related U.S. Application Data

(60) Provisional application No. 60/309,239, filed on Jul. 31, 2001.

(51) Int. Cl.
*H04B 7/12* (2006.01)

(52) U.S. Cl. .............. 375/240.12; 341/51; 348/445

(58) Field of Classification Search .......... 375/240.12, 375/240.2, 240.24, 240.18, 240.01, 240.02; 341/50–52, 56, 62, 65, 67, 66; 707/200, 707/203; 348/441, 445
See application file for complete search history.

(56) References Cited

U.S. PATENT DOCUMENTS

| | | | |
|---|---|---|---|
| 4,873,684 A | 10/1989 | Kobayashi et al. | |
| 5,187,577 A | 2/1993 | Kim | |
| 5,228,130 A | 7/1993 | Michael | |
| 5,299,144 A | 3/1994 | Bartkowiak et al. | |
| 5,341,492 A | 8/1994 | Sakata | |
| 5,361,220 A | 11/1994 | Asano | |
| 5,398,078 A | 3/1995 | Masuda et al. | |
| 5,633,897 A | 5/1997 | Fettweis et al. | |
| 5,799,201 A | 8/1998 | Lorenz et al. | |
| 5,835,145 A * | 11/1998 | Ouyang et al. | .......... 375/240.2 |
| 5,941,940 A | 8/1999 | Prasad et al. | |
| 6,038,675 A | 3/2000 | Gabzdyl et al. | |
| RE37,048 E | 2/2001 | McCollum | |
| 6,209,017 B1 | 3/2001 | Lim et al. | |
| 6,243,734 B1 | 6/2001 | Doshi et al. | |
| 6,407,680 B1 * | 6/2002 | Lai et al. | .................. 341/50 |
| 6,421,094 B1 | 7/2002 | Han | |
| 6,421,695 B1 | 7/2002 | Bae et al. | |
| 6,463,445 B1 * | 10/2002 | Suzuki et al. | ............... 707/200 |
| 6,516,031 B1 | 2/2003 | Ishihara et al. | |
| 6,523,071 B1 | 2/2003 | Klinger et al. | |
| 6,591,381 B1 | 7/2003 | Kim et al. | |
| 6,593,860 B1 * | 7/2003 | Lai et al. | .................. 341/50 |
| 6,647,061 B1 * | 11/2003 | Panusopone et al. | .. 375/240.12 |
| 6,701,405 B1 | 3/2004 | Adusumilli et al. | |
| 6,704,493 B1 | 3/2004 | Matthews et al. | |
| 6,728,862 B1 | 4/2004 | Wilson | |
| 2001/0016884 A1 | 8/2001 | Sato et al. | |
| 2002/0015528 A1 | 2/2002 | Kondo et al. | |
| 2002/0196855 A1 | 12/2002 | Miyagoshi et al. | |
| 2002/0199040 A1 | 12/2002 | Irwin et al. | |
| 2003/0014457 A1 | 1/2003 | Desai et al. | |

* cited by examiner

*Primary Examiner*—Gims Philippe
(74) *Attorney, Agent, or Firm*—Fenwick & West LLP (57) ABSTRACT

A video compression scheme enables the user to select one of many video compression formats, including the widely-used standard video formats such as MPEG-1, MPEG-2, MPEG-4 and H.263. In one embodiment, the scheme is implemented as a hardware-software combination, with the hardware portion, preferably implemented as an ASIC chip, performing the core compression and the software portion dealing with the detailed formatting. In another embodiment, a 32-bit aligned transitional data format is used.

45 Claims, 7 Drawing Sheets

MULTIPLE FORMAT VIDEO COMPRESSION

CROSS REFERENCE TO RELATED APPLICATION

This application claims priority under 35 U.S.C. § 119 (e) to co-pending U.S. Provisional Patent Application No. 60/309,239, entitled "Video Processing System with Flexible Video Format," filed Jul. 31, 2001, the subject matter of which is incorporated by reference in its entirety herein.

TECHNICAL FIELD

The present invention relates generally to video processing, and in particular to a video compression scheme having a format that is compatible with a wide variety of video formats. Additionally, the present invention allows a user to select amongst multiple compression formats without the need for added hardware nor associated reconfigurations.

BACKGROUND OF THE INVENTION

Digital multimedia includes video, images and audio data, typically involving a large amount of data. For instance, a twenty-second digitized movie has a data size of 650 Mbytes, and a two hours worth of uncompressed video data would occupy 360 compact disks. Similarly, transmitting a two-hour movie having an uncompressed data format at a rate of 128 kbps would take 169 days.

Video compression has been widely adopted since the advent of digital multimedia technology and the popularization of DVD, web images, mp3 and digital cameras. Several video compression standards have been adopted for a variety of different applications. These include the International Standard Organization (ISO) video compression formats MPEG-1, MPEG-2 and MPEG-4, developed by the Moving Picture Experts Group, and the ITU H.261 and H.263 video standards. These standards came into being at different times when the stage of multimedia technology development had different needs. For example, the MPEG-1 standard supports a 352×240 resolution and an input frame rate of 30 frames per second (fps), and produces video quality slightly below the quality of conventional VCR videos, whereas MPEG-2 supports up to a 1280×720 resolution and an input frame rate of 60 fps and produces video quality sufficient for all major TV standards, including HDTV, with full CD-quality audio. MPEG-2 is also used with DVD-ROM since it has a relatively high compression ratio, defined simply as the ratio of compressed to uncompressed data. The MPEG-4 standard is based on MPEG-1, MPEG-2 technology and is designed to transmit video and images over a narrower bandwidth. MPEG-4 further provides the mixing of video with text, graphics and 2-D and 3-D animation layers. H.261 and H.263 are mainly developed for teleconferencing applications that require both the encoder and decoder operate in real time. H.261 and H.263 have many elements in common with MPEG-1. For H.261, the image dimensions are restricted to two sizes, 352×288 and 176×144. H.263 is based on H.261 but supports more image dimensions.

Each of these conventional standards, including those discussed above, may have its unique application and value. With the advance of the Internet comes the possibility of multimedia over IP networks, wherein the same video data may be desirable for different applications, possibly by different users. Unfortunately, the existing standards for video compression do not allow for inter-convertibility. Hence, one cannot receive an MPEG-2 video stream and convert it into an MPEG-4 stream. Indeed, under the MPEG-4 standard, a video stream may include 2-D and 3-D animations that cannot be included when a video stream is transmitted in MPEG-2 format, by way of example. The inability to build versatility into video transmission may become a serious setback in the future development of broadband communication mega-networks.

On another front of the advancement in multimedia technology, custom-designed hardware devices are replacing generic computing platforms to handle video compression more efficiently. Compression of video data is performed on the fly within the input device such as a PC camera, making real-time video-telephony or video-conferencing a reality. As more hand-held portable devices are equipped to handle multimedia video formats, the video compression hardware is becoming more streamlined by design. Dedicated application specific integrated circuit (ASIC, also referred to as "chip") and system-on-chip (SoC) applications are being developed. Even so, such chips may not be available for more complex video formats such as MPEG-4, which is usually the desired format for video transmission through the Internet.

The trend towards broadband multimedia transmission requires flexibility in the video format, and the present generation of video chips suffer from the drawback of being able to handle only a single format of video data. Because of the lack of inter-convertibility of the video compression standards, to enable a choice of different output formats from the video intake devices such as a PC camera would require the use of multiple video compression chips, or a "monster" chip with complex and costly circuitry for accommodating the multiple video formats. Such solutions are unattractive solutions as they are both cumbersome and costly.

Accordingly, what is needed is a versatile video compression scheme that enables the dynamic selection of video output formats. The scheme should have sufficient flexibility to allow for the easy implementation of video compression based on all state-of-the-art standards. Also, the scheme must allow the developer to take advantage of the continuous advances in ASIC and SoC technologies which greatly enhance the efficiency and reliability of video transmission.

SUMMARY OF DESCRIBED EMBODIMENTS

The present invention overcomes the deficiencies and limitations of the prior art by providing a system for video compression which facilitates the use of multiple video compression formats. One aspect in accordance with the present invention includes a novel system for performing video compression amongst two separate platforms. In one embodiment of the present invention, the core compression processing is performed using front and back end subsystems to produce a transitional data stream. Additionally, a separate transcoder is provided to process the transitional data stream that is provided to a host device, transcoding the transitional data into a video stream having format compatible with one of a multitude of desirable video formats. Examples of such desirable video formats include the MPEG-1, MPEG-2, MPEG-4 and H.263 standard formats.

One aspect in accordance with the present invention takes advantage of the fact that the coding of many standard video formats share a substantial amount of common process steps or core algorithms. It is therefore beneficial to devise a common method to accomplish all of the core algorithms, while off-loading any remaining process steps concerning detailed formatting to a separate processor. The latter processor can then include the process steps for enabling multiple formats, without necessarily creating an undue burden in its implementation.

According to an additional aspect of the present invention, a transitional data stream format is designed to facilitate the division of the video compression tasks. This transitional data stream is designed to be simple to use. Furthermore, the hardware design incorporates substantially all information required for encoding video data according to any one of the desirable compression standards. In one embodiment in accordance with the present invention, a 32-bit aligned data format is associated with an optimal compression ratio.

The present invention takes advantage of the speed offered by processing a substantial majority of the compression algorithm within the front and back end subsystems. Furthermore, the present invention is flexible and can be used with a variety of host devices since a separate platform for formatting or encoding the video data is used to subsequently produce a video data stream compatible with a multitude of desirable formats. In one embodiment of the present invention, the separate platform is a general purpose computing apparatus running transcoding software.

The features and advantages described in this summary and the following detailed description are not all-inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF DRAWINGS

The teachings of the present invention can be readily understood by considering the following detailed description in conjunction with the accompanying drawings.

The figures depict certain embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

A system, method, computer medium and other embodiments for video compression are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention with unnecessary details.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like. Furthermore, it has also proven convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer-based system memories or registers or other such information storage, transmission or display devices.

One aspect of the present invention includes an embodiment of the process steps and instructions described herein in the form of a computer program. Alternatively, the process steps and instructions of the present invention could be embodied in firmware or hardware, and when embodied in software, could be downloaded to reside on and be operated from different platforms used by video processing systems and multimedia devices employed with real time network operating systems and applications.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, ASICs, or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Reference will now be made in detail to several embodiments of the present invention, examples of which are illustrated in the accompanying drawings. Wherever practicable, the same reference numbers will be used throughout the drawings to refer to the same or like parts.

Overview of the Video Compression Scheme

Figure 1:
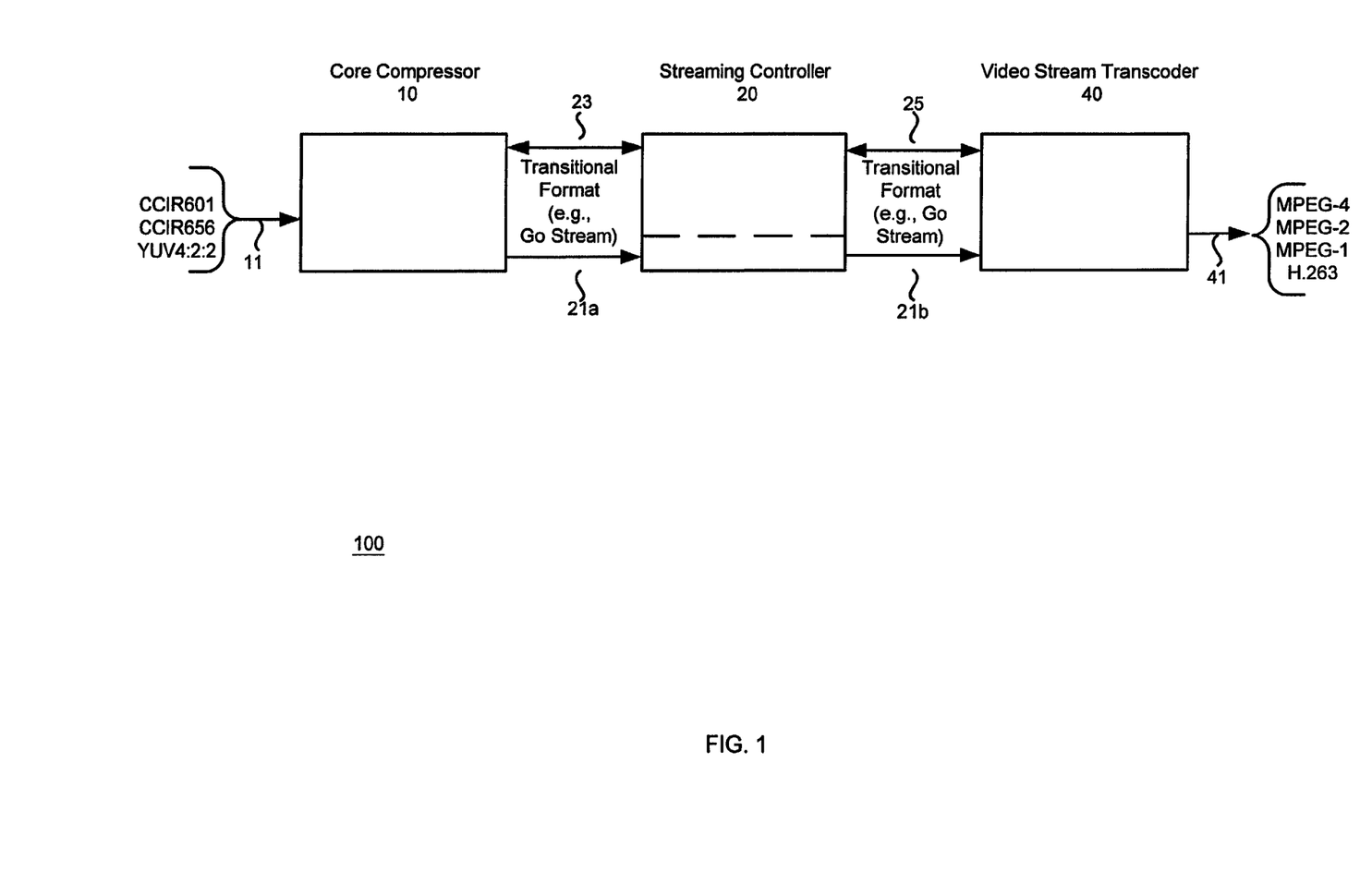
FIG. 1 is a high-level block diagram illustrating a video compression scheme in accordance with the present invention.

FIG. 1 is a high-level block diagram illustrating the basic concept of a multiple-format video compression scheme in accordance with the present invention. The described embodiment includes a system 100 having a core compressor 10, a streaming controller 20 and a video stream transcoder 40. The video data stream 11 of an initial format is converted by core compressor 10 into a transitional data stream 21a, 21b with an intermediate format, which is then sent by streaming controller 20 to the video stream transcoder 40. In turn, transcoder 40 converts the transitional data stream 21b into an output video stream 41 with a final format. It will become apparent that lines 21a, 21b and 41 represent both the communication channels and the corresponding data stream flowing therethrough. The direction of each arrow indicates the direction of data flow in the corresponding channel. The streaming controller 20 also communicates control signals with core compressor 10 and video stream transcoder 40 via the bi-directional communication channels 23 and 25, respectively.

Each of the blocks shown in FIG. 1 has its unique functions. Both the core compressor 10 and video stream transcoder 40 perform transformations on the video stream, producing a video stream having an intermediate format that can be easily converted into streams of different desired formats as discussed below, and transmit the transformed stream onward. Transmitting the video data onward is usually referred to as "streaming." The streaming controller 20 controls the streaming schedule and the data channels between the compressor 10 and the transcoder 40. In one embodiment in accordance with the present invention, the core compressor 10 can be implemented on an ASIC, whereas the video stream transcoder 40 can be implemented in software and downloaded to a host (see FIG. 3) with computing capabilities, such as a personal computer. One example of such an implementation is the GO.7007 chip (Go chip), developed by WIS Technologies, Inc. of San Jose, Calif., and the associated software. The controller 20 may either be hardwired in the ASIC, included in the host device software driver, or implemented in a hardware-software combination. In the following discussion, whenever applicable, "Go chip" will be used interchangeably with a particular ASIC implementation of the present invention, by way of example. Those of skill in the art will recognize that present invention is well-suited to work with a variety of other implementations.

The incoming video stream 11 in FIG. 1 may include raw, or uncompressed, video data in the form of a bit stream, which may be of any of a plurality of formats. By way of example, the format of video stream 11 may comply with the Consultative Committee for International Radio (CCIR, now ITU-R) 601 committee recommendation which has been adopted worldwide for uncompressed digital video used in studio television production. This standard is also known as 4:2:2. Also, video stream 11 may be of the parallel extension standard, namely CCIR 656 with PAL and NTSC, which had been incorporated into MPEG as the Professional Profile. CCIR 656 sets out serial and parallel interfaces to CCIR 601. Other suitable video formats include: YUV 4:2:2 interlace, 8-bit YUV with Vsysnc/Hsysnc/Fodd or Vref/Href format, interlace and progressive, and 10-bit RGB Bayer with Vsysnc/Hsync CMOS sensor format, though the latter two are not explicitly shown in FIG. 1. The support size can vary from 352×288 to 720×480 (at 30 fps) or 720×576 (at 25 fps), while the support input frame rate can vary from 10 fps to 30 fps. It is noted that these values are provided by way of example, and that the invention is not limited to these formats and parameters, but may work suitably well with other types of formats and parameters. In other embodiments, the video stream 11 may be coupled with an audio component, for example, in a combined data format such as inter-IC signal (IIS) format. In the latter case, the appropriate IIS data rates, which typically are at speeds of several Mbits/second, may be selected for transferring audio data. It will be appreciated that CCIR 656 and IIS are only examples of possible digital data formats, and that other formats are equally possible. An audio/video interface, although not shown in FIG. 1, may be coupled to the core compressor 10 to receive the incoming (video and/or audio) signals and to buffer data from such signals.

The source of the video stream 11 may be a multitude of devices that provide a digitized video bit stream, like for example, a Complementary Metal Oxide Semiconductor (CMOS) device or Charge Coupled Device (CCD) sensor (without glue logic) typically used in a digital camera and PC camera. By way of background information, in a digital camera, CCDs can be analogized to operating like film. That is, when they are exposed to light, CCDs record the intensities or shades of light as variable charges. In the field of digital cameras, the charges are converted to a discrete number by analog to digital converters. It will be recognized that other types of sources capable of generating a digitized video bit stream may work suitably well with the present invention, including sources in the nature of a personal video recorder, a video-graphics capture and processor board, and a digital camcorder.

Still referring to FIG. 1, the core compressor 10 receives the bit stream 11 and transforms it into a transitional video data stream 21a, with a compression format used internally within the system 100. The use of an internal compression format allows the transitional data stream 21a, 21b to be closely controlled within the system 100, which may then be more easily outfitted with custom-designed hardware and software components. In one particular embodiment, a Go chip is custom-designed for using such a transitional data stream, in which case the transitional data stream is referred to as Go stream 21. For purposes of illustration, the term "Go stream" is used below to refer to a particular implementation of this transitional data stream 21. The internal Go stream format will also be discussed in the section below after the components of each of the three blocks 10, 20 and 40 are further described in detail.

In the described embodiment, the controller 20 transforms the Go stream 21a into Go stream 21b. The format of Go streams 21a, 21b remain unchanged, although buffers may be employed in the controller 20 so that the Go stream may be flowing at different rates or with different batch sizes in the two channels 21a and 21b.

As shown in FIG. 1, the video stream transcoder 40 receives the Go stream 21b and transforms it into an output stream 41 having one of a variety of desirable video compression formats. Several possible video compression formats, all described above in the Background section, are shown with the output stream 41, by way of example. It will be readily apparent to one skilled in the art that other video compression formats not explicitly shown can also be included as output options.

Figure 2A:
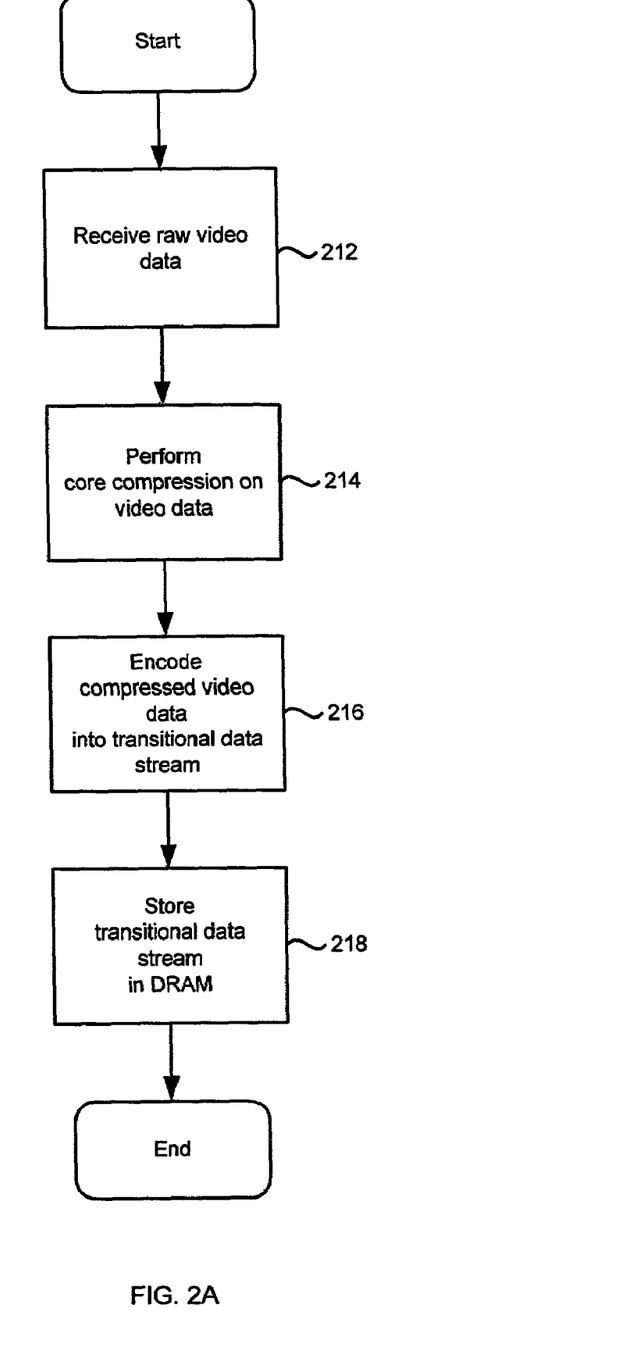
FIG. 2A is a flow chart illustrating one embodiment of the process steps utilized by a core compressor 10 of FIG. 1.

Each component 10, 20 and 40 in FIG. 1 uses its own process steps in the overall video compression scheme. Referring to FIG. 2A, which illustrates a flowchart of one embodiment of the process steps employed by the core compressor 10 to process the uncompressed video data and to transform such data into a transitional data stream (e.g., Go stream 21) that is compatible with some other formats. After receiving 212 the raw video data, the core compressor 10 performs the core compression step on the video data. "Core compression" is referred herein to include the majority of the steps taken in a conventional video compression algorithm. As is readily apparent to a person with ordinary skill in the art, these steps may include, for example, motion compensation and estimation, discrete cosine transformation (DCT) and quantization. The corresponding reverse steps, required often for encoding video signals, may also be included in the core compression. These steps include decompensation, inverse DCT and dequantization. Further description regarding the core compression will be provided subsequently. According to one aspect of the present invention, no variable length coding (VLC), i.e., the conventional "encoding" step in most existing video compression schemes, is performed within core compression. Without this encoding step, typically performed at the end of the compression process, the compression ratio, or the ratio of the size of the compressed data to that of the raw data, may be much higher than normally achievable with the conventional video compression schemes. The core compressor 10 can be designed to produce compressed data that includes substantially all information required for subsequent encoding according to any of the desirable standard video formats.

Since the compressed data produced from performing core compression alone is often unacceptably large for the purpose of video stream transmission, another step is required to further compress the data by encoding 216 the once-compressed data into a transitional data stream, e.g., Go stream 21. The internal format of this transitional data stream can be designed to preserve (from the raw data) substantially all information required for subsequently transcoding the original raw video data ultimately into a video stream 41 compatible with any of a multitude of desirable standard video formats. It will be appreciated that such flexibility is not conventionally achievable if the once-compressed data is directly encoded in one of the standard video compression formats.

Once the encoding 216 is performed, the resulting transitional data stream 21 may be stored 218 in a memory buffer, like for example, a dynamic random access memory (DRAM). This buffered data is ready for transmission out of the core compressor 10 to be further processed. As shown in FIG. 1, and as will be further described in detail, the transitional video data stream 21 is transmitted through the streaming controller 20 to the video stream transcoder 40.

Figure 2B:
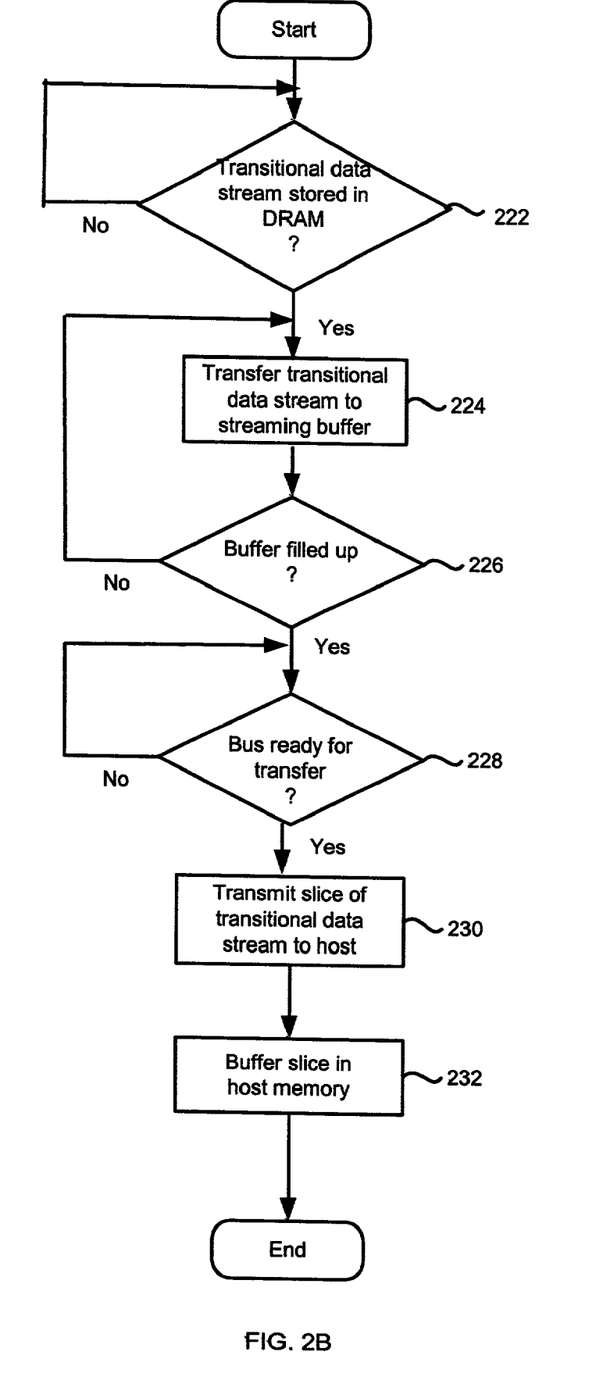
FIG. 2B is a flow chart illustrating one embodiment of the process steps utilized by a streaming controller 20 of FIG. 1.

Reference is now made to FIG. 2B, which illustrates one embodiment of the process steps involved in the streaming process. Since the transitional data stream 21 is being buffered in DRAM, the algorithm begins with determining 222 whether the transitional data stream 21 exists in the DRAM buffer and requires streaming. If so, the data stream 21 can be transferred 224 to a streaming buffer (see FIG. 3), implemented for example in one embodiment as part of the external interface of the Go chip. When the streaming controller 20 finds 226 that the streaming buffer is filled up, it checks 228 whether the transfer bus is ready for data transmission. If and when the transfer bus is ready, a slice of transitional data stream 21 is transmitted 230 to a host device which includes the video stream transcoder 40.

In one embodiment in accordance with the present invention, the video stream transcoder 40 is embodied as driver-level software and is implemented on a host device which may be a general purpose computer connected to a network. In that embodiment, the transitional data stream 21 can be buffered 232 within a memory device associated with the host device until the transcoder 40 accesses the memory device to begin the transcoding process, which will be described in further detail subsequently.

Figure 2C:
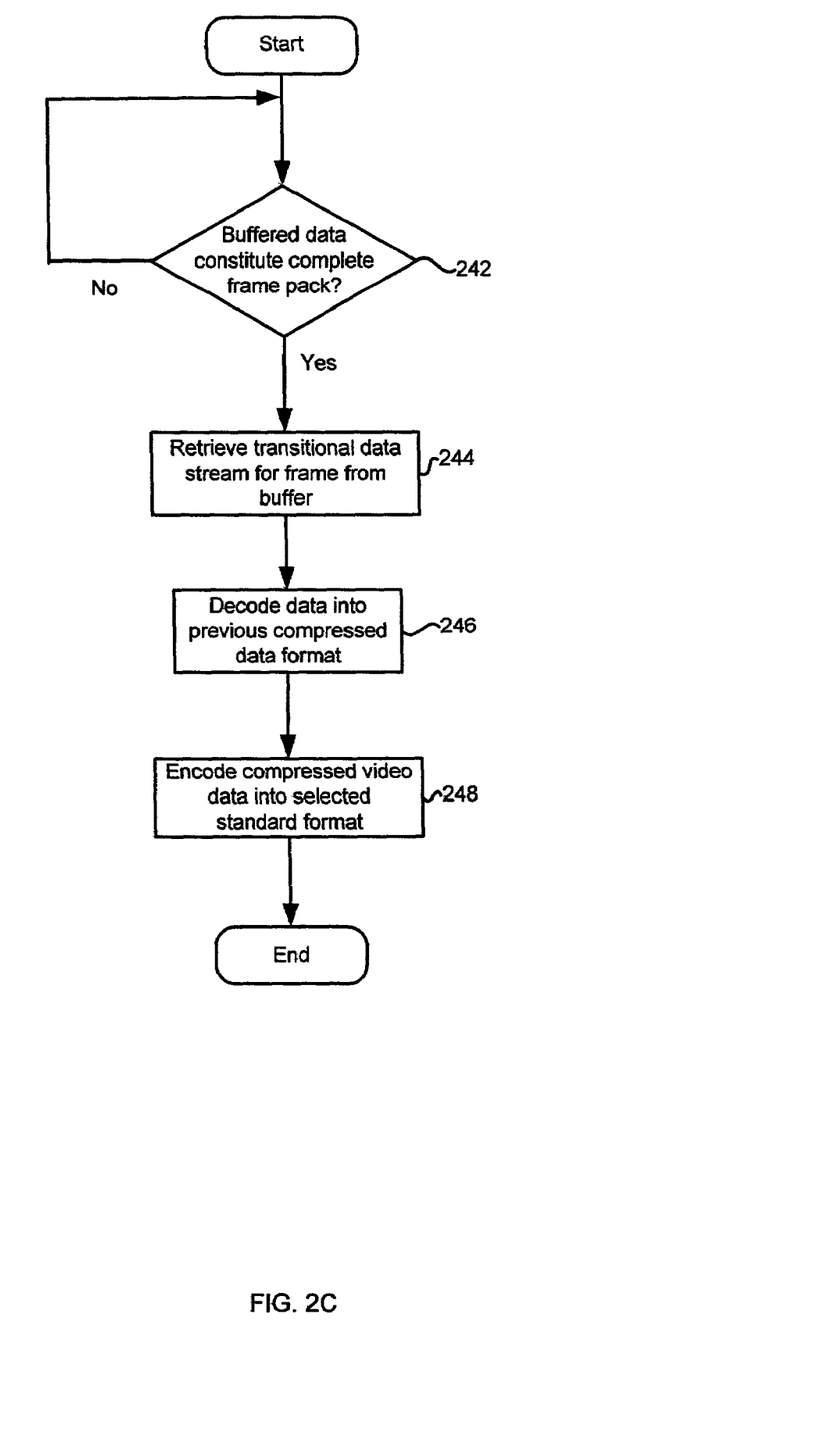
FIG. 2C is a flow chart illustrating one embodiment of the process steps utilized by a video stream transcoder 40 of FIG. 1.

Reference is now made to FIG. 2C, which shows a flow chart illustrating one embodiment of the process steps undertaken by the video stream transcoder 40 in accordance with the present invention. The same steps can be employed whether the transcoder 40 is implemented in software, firmware or with hardware. First, it is determined 242 whether data from the Go stream or some other transitional data stream buffered within the host memory comprises a complete frame pack, meaning a complete set of data defining a frame. This is done because the trancoding can usually be more efficiently accomplished on a frame-by-frame basis. Hence, the transcoder waits until the buffered data constitutes a complete frame pack, at which time the transitional data stream is retrieved 224.

Subsequently, the transitional data stream retrieval is decoded 246 into an intermediate compressed video data format that retains all information included in the original format of data stream 11. This technical aspect is useful for further encoding the video data stream into any of the various standard video compression formats. One example of a suitable intermediate compressed data format was previously discussed (in relation to FIG. 2A) wherein only core compression is performed on raw video data. It will, however, be appreciated by one skilled in the art that a multitude of formats may work suitably-well for this decoding step 246 as long as the format used is consistent with the core compression step 214.

Once the Go stream is decoded 246 and a compressed video data format is determined, the video stream transcoding 40 encodes 248 the compressed video data into data output stream 41 having one or more of the desirable standard video compression formats. As discussed above, some commonly desirable formats are MPEG-1, MPEG-2, MPEG-4 and H.263.

An Exemplary Video Compression System

Figure 3:
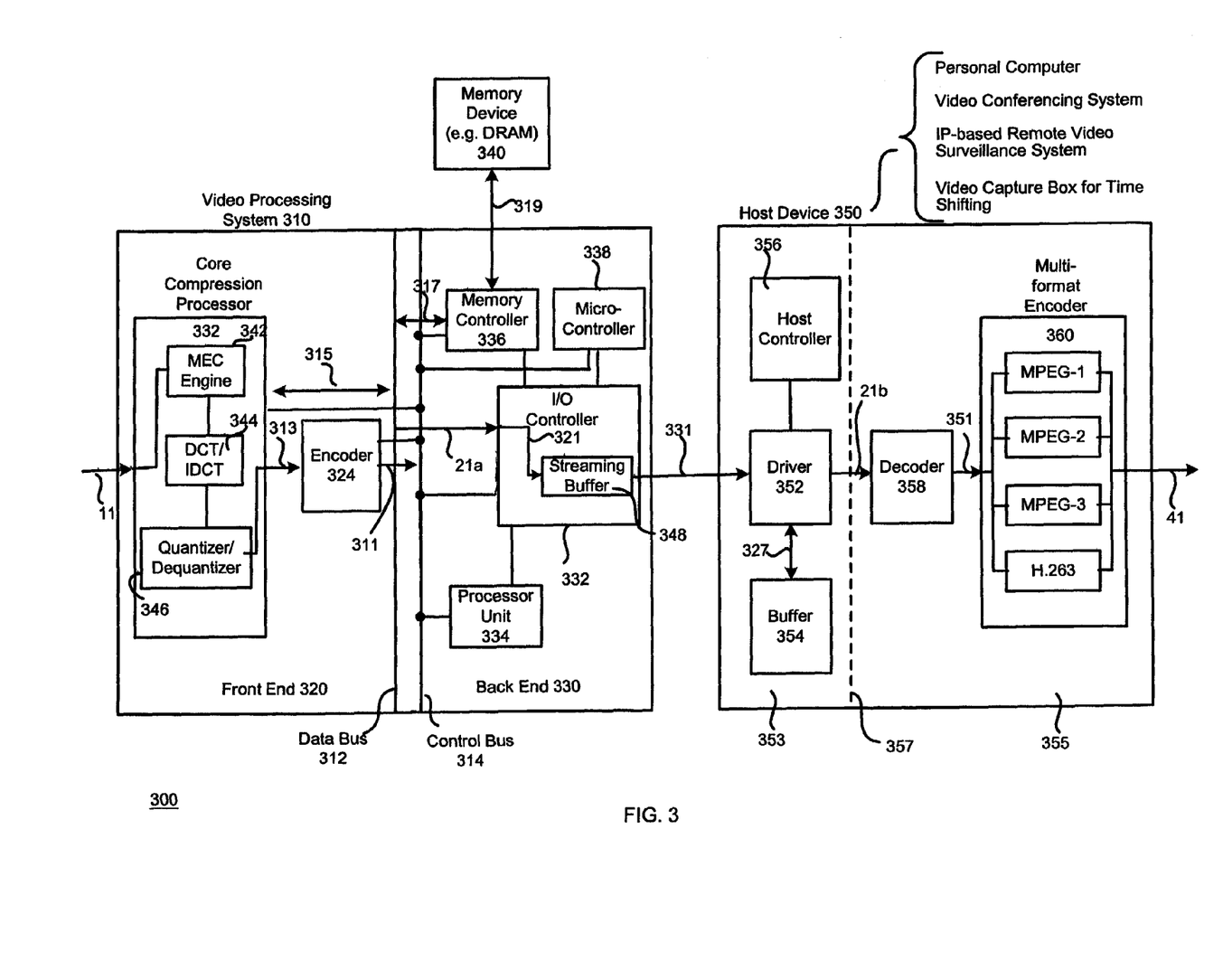
FIG. 3 is a detailed block diagram of one embodiment of the video compression system of FIG. 1.

The scheme according to the present invention as illustrated in FIG. 1 can be implemented in a variety of different ways, involving different sets of components. One embodiment of a system in accordance with the present invention is illustrated in FIG. 3. The system 300 of FIG. 3 provides more details than system 100 of FIG. 1. To this end, system 300 may be considered a particular embodiment of system 100.

As indicated in FIG. 3, system 300 includes at least two components, namely a video processing system 310 and a host device 350. Each of these two components will be discussed in more detail below. Applications of the system 300 design are discussed in the next section. For ease of understanding and by way of example, the video processing system 310 may be implemented as an ASIC embedded in a video camera-type appliance, whereas the host device 350 can for the most part be equated to a personal computer connected to a network. A person with ordinary skill in the art would recognize that system 300 could also be implemented in many other fashions.

To understand the relationship between system 300 and system 100, first observe that the video processing system 310 can generally be subdivided into two subsystems, a front end subsystem 320 of video compression components and a back end subsystem 330 of control elements. Similarly, the host device 350 includes certain control components, shown on the left side 353 of a phantom line 357 within the host device 350 in FIG. 3, and the transcoder components shown to the right 355 of the phantom line 357. By analogy, one may assume that the core compressor 10 of FIG. 1 is equivalent to a combination of the front end subsystem 320 and certain control elements, including, for example, the processing unit 334, which enables the controlling and scheduling of communications within the front end subsystem 320, the DRAM 340 and the memory controller 336. As for the video stream transcoder 40 of FIG. 1, an analogous sub-system in FIG. 3 would include the components within the host device 350 on the right hand side 355 of the phantom line 357. The remaining components shown in FIG. 3, as well as the processor unit 334 and memory controller 336, which also assist with the streaming of video data, are exemplary of an implementation of streaming controller 20 of FIG. 1.

Based on the analogy drawn above between FIGS. 1 and 3, one skilled in the art will appreciate that the video stream input 11 and output 41, as well as the transmission channels 21a and 21b for the transitional data stream 21, are part of both systems 100 and 300. Hence, the arrowed lines 11, 21a, 21b and 41, indicating the main streaming route of the video data in various formats in FIG. 1, are preserved in FIG. 3. Note, however, that by virtue of the additional details included in FIG. 3, additional routes for the data stream are also shown, in particular lines with one or two arrows, indicating unidirectional and bi-directional transfer of data, respectively. Note also in FIG. 3 that other lines (without arrows) between different components are included to indicate communicative coupling, generally related to the exchange of control and scheduling information such as commands and requests.

Referring to the video processing system 310 in FIG. 3, the front end and back end subsystems 320, 330 are connected by the data bus 312 and the control bus 314. In the described embodiment, no direct communications channels are included between components of the front end and those of the back end. All communications are effected through the two buses 312 and 314. Communications between the front end and the back end subsystems 320, 330 enable the front end video compression components, which generally depend on the processor unit 334 for control and scheduling of data transfer and on the memory controller 336, to utilize the DRAM 340, which is coupled to the back end subsystem 330.

As mentioned above, data flow in system 300 is indicated in FIG. 3 by arrowed lines. The input video data flows past the front end 320 through the channels 11, 313 and 311 to the back end 330. Then the data streams through channels 21a, 321 and 331 to host device 350, in which data is transferred into and out of the transcoder portion 355 of the host device 350 through channels 21b, 351 and, finally, 41. When the data travels through a component of system 300 into the next data channel as described above, the data stream format changes, except for the sequence 311, 21a, 321 and 331 in which the transitional video data stream sails through various streaming devices, as depicted in FIG. 1 collectively as streaming controller 20.

FIG. 3 also shows several bi-directional data channels 315, 317 and 319. These are merely examples illustrating the way the front end components utilizes the DRAM 340 as a buffer in processing the video data. In the described embodiment, the front end subsystem 320 of the video processing system 310 performs the compression of the video data, whereas the back end subsystem 330 provides control and scheduling to synchronize the front end components, as discussed above. The latter tasks are performed with the help of the memory device 340, in a manner described below, as well as the data bus 312 and control bus 314. Hence, the back end subsystem 330 issues commands through the control bus 314 to regulate the data flow in the data bus 312 both to various front and back end components and to and from the DRAM 340, preferably through memory controller 336.

The front end subsystem 320 includes at least a core compression processor 322 and an encoder 324. The core compression processor 322, as its name indicates, performs the core compression described above in connection with FIG. 2A. In one embodiment, this core compression processor 322 comprises a motion estimation and compensation (MEC) engine 342, a discrete cosine transformer (DCT)/inverse discrete cosine transformer (IDCT) 344, and a quantizer/dequantizer 346. Though not explicitly shown in FIG. 3, the core compressor processor 322 may also include a preprocessor that accepts raw pixel data input, and some internal memory device or registers in the form of static random access memories (SRAMs), by way of example.

In general, motion compensation involves the use of the motion vector to extract the predicting block from the reference frame, to subtract it therefrom, and to use the resulting difference for further compression. Motion estimation involves ascertaining the best motion vector to be used in predicting the match block from the current frame. DCT is a block-based orthogonal transformation of a block of picture elements to a matrix of spatial frequency coefficients for the reduction of spatial redundancy, typically after motion compensation prediction or interpolation. One aspect of the DCT operation is to provide a very small error over the ideal floating model, and to reduce the mis-match of decoding function to as small as it can possibly be. Quantization provides further data compression by mapping the data to a representation that strips away unnecessary information, in general, based on zig-zag scans over a macro block.

The encoder 324 generally provides lossless encoding of the compressed video data into the format of the transitional video data. By including a variable length coding (VLC) encoder, shorter code words may be assigned to events occurring frequently and longer code words to events occurring less frequently. According to one embodiment, the encoder 324 can process a pixel every four clocks, and the output is 32 bits wide and can be buffered in units of macro blocks, to be described in more detail in the next section. The use of VLC is useful for reducing the number of bits used during encoding and video compression of motion data. Hence, using the same example described above, the transform coefficients are quantized, and then the quantization labels are encoded using variable-length coding into the transitional video data format. The encoder 324 can be programmed to accommodate different targeted compression standards.

The back end subsystem 330 is preferably a general microprocessor-based computing system. In the embodiment illustrated in FIG. 3, the back end subsystem 330 comprises an input/output (I/O) controller 332, a processor unit 334, a memory device 340 (which is shown as a DRAM external to back end 330 in FIG. 3), a memory controller 336, and a micro-controller 338. In particular, the processor unit 334 may be any suitable processor with on-chip memory for processing sub-sampled video signals, such as an Intel i860 pixel processor, programmed to implement the motion estimation and compensation techniques of the present invention. Preferably though and according to one implementation of the video processing system 310, processor unit 334 is a RISC-based central processing unit (CPU) capable of controlling and coordinating the transfer of blocks of data, but not necessarily handling the video processing. This keeps manufacturing costs of system 310 low, which is particularly beneficial when system 310 is utilized in ASIC and System-on-Chip applications. By way of example, suitable general parameters for choosing a low cost RISC CPU 334 include a 16-bit arithmetic logic unit (ALU), an 18-bit instruction set, and an operating speed of up to 100 MHz. An bus and interrupt controller may be used to handle the workflow of the data and control signals for the computing processes of processor unit 334, including for example, handling hardware and software interrupts, as well as those generated by I/O signals.

Memory device 340 may be any suitable computer memory device for storing picture data, such as a DRAM or video random access memory (VRAM) device, under the control of memory controller 336. The memory device 340 may be integrated into back end 330 or located externally thereto, as in FIG. 3. In one embodiment where the memory device is a DRAM, controller 336 may comprise a corresponding DRAM controller performing the physical transfers of data between the DRAM 340 and a multichannel controller, though not explicitly shown in FIG. 3. The multichannel controller may in turn be one or more direct memory access (DMA) controllers selected to accommodate any suitable number of DMA channels used to transfer the retrieved video data into packed pixel format or planar bit maps, typically from the DRAM 340 to each data block for processing by the MEC engine within the core compression processor 322. By way of example, a DMA controller may use 8, 32 or any other number of channels, to transfer data from the DRAM 340 to each data block without necessarily utilizing the processing resources of CPU 334.

I/O controller 332 couples video processing system 310 to various external devices and components, including host device 350, using a variety of data standards and formats. For example, I/O controller 332 can include an output channel along host bus 331 that is compatible with a Peripheral Component Interconnect (PCI) bus typically having a wider bandwidth than the traditional industry standard architecture (ISA) bus, and allowing peripherals to transfer data at higher speeds. It can also include a Universal Serial Bus (USB) hardware interface for low-speed peripherals such as the keyboard, mouse, joystick, scanner, printer and telephony devices. A person with ordinary skill in the art would recognize that these types of ports in I/O interface 332 are only examples of possible port data formats, and other formats are equally possible.

The I/O controller 332 also serves as the bridge between the front end subsystem 320 of the video processing system 310 and various external processors. The term "external processor" is used here to include not only the host device 350, but also a micro controller 338. The connection to the external processors may be implemented through a host parallel interface (HPI) bus. The micro controller 338 provides control for the operation of the HPI bus. This control includes the initialization and configuration of the video processing system 310 itself, which is discussed further below. Micro controller 338 is similar to host controller 356 which can also be programmed to perform the function just described. However, it is generally more efficient to include the controller 338 as part of the video processing system 310, as opposed to taking commands from the host device 350 for handling functions such as streaming and configuration.

Streaming data is a function of the I/O controller 332, wherein encoded video data is transferred in streams through the HPI bus 331 to the host device when the video processing system 310 is operating. To enhance performance, a streaming buffer 348 is implemented in the I/O controller 332. This streaming buffer 348 includes thirty-two 32-bit registers, by way of example. Streaming data is written to the buffer 348 by direct memory access enabled through the memory controller 336 over data bus 312. Because the width of the HPI address/data bus is 16-bit, which is half the width of the data bus 312, the external device issues sixty-four consecutive reads to access the complete content of the buffer.

Host device 350 can take a variety of forms, including for example, PCs, applications supported by network enabled systems, servers, high quality PC video cameras for video conferencing, video recorders, video capture boards for MPEG-1, MPEG-2, MPEG-4, H.263 and H.261, IP based remote video surveillance systems, video capture boxes for time shifting purposes, network computing systems, mobile visual communication, wireless communication by MPEG-4 over CDMA, and personal digital assistant (PDA) enabled with multimedia features. Host device 350 may include driver level transcoding software to convert the compressed stream of data from I/O controller 332 into MPEG-1, MPEG-2, MPEG-4, or H.263, by way of example. In one embodiment illustrated in FIG. 3, host device 350 can include a driver 352 to transmit the transitional video data stream received over line 331 through channel 21b. Also shown in FIG. 3 is a buffer 354 for temporarily buffering the transmittal video data stream received, and a host controller 356 for regulating the streaming of the video data. One skilled in the art will readily recognize that controller 356 may also be useful in other aspects, such as facilitating the initialization and configuration of the video processing system 310 by providing the relevant parameters associated with the host device 350, by way of example.

The architecture of the host device 350 also includes a decoder 358 and multi-format encoder 360. These together form the equivalent of the transcoder 40 of system 100 illustrated in FIG. 1. The decoder 358 essentially serves to decode the encoded video signal received from the front end subsystem 320. The encoder 360 performs a VLC operation on the decoded video data based on the standard format which is selectable by the user. For example, an original equipment manufacturer (OEM) may program all four formats MPEG-1, MPEG-2, MPEG-4 and H.263, as illustrated in FIGS. 1 and 3, into their host software, allowing the users a choice of formats by providing their preference as input to the host software. This is possible because the transitional data stream 21 can be designed to include all the information required by these formats, as further discussed in the next section. It will be readily apparent to those skilled in the art that, by implementing the multi-format encoder 360 in software form, additional standard video formats can be easily programmed into the host device 350.

Those skilled in the art will also recognize that the blocks of FIG. 3 are functional blocks that may be implemented either by hardware, software, or a combination of both. Given the functional description of these blocks, a person of ordinary skill in the art will be able to implement various components described using well-known combinational and/or sequential logic, as well as software without undue experimentation. Those skilled in the art will recognize that the present invention is not limited to the video compression system described above, but is applicable to any video processing system.

Multiple Format Video Data

As discussed, there exists many video compression standards, such as MPEG-1, MPEG-2, H.261 and H.263, each of which may be desirable for a different application. Many of these standards share some common processing methods and core algorithms, but may differ in options and details. FIG. 3 shows a system 300 that is well-suited to work with a wide variety of video standards. In order to enable the video processing system 310 to work with a wide variety of standards, common aspects amongst these standards can be extracted and included in the format of the transitional video data stream. According to one aspect of the present invention, the data processing operations may be off-loaded to an external processor such as that represented by host device 350 in FIG. 3, for example, by running a corresponding computer software program. The external processor can be designed to configure the output stream 41 to comply with the desirable standards. In this way, one can take advantage of the high speed of a video processing system implemented as an ASIC and of the flexibility of a software program to facilitate the transcoding functions by a host device. To achieve this division of tasks, the intermediate video data streaming format effectively forwards the transitional data stream from the video processing system to the external processor associated with the host device for transcoding into one of multiple output video formats. By way of example, the Go stream format developed by WIS Technologies Inc. of San Jose, Calif., is one transitional video streaming format that supports this concept, although one skilled in the art would appreciate that other formats can also be designed for use with the present invention.

Figure 4:
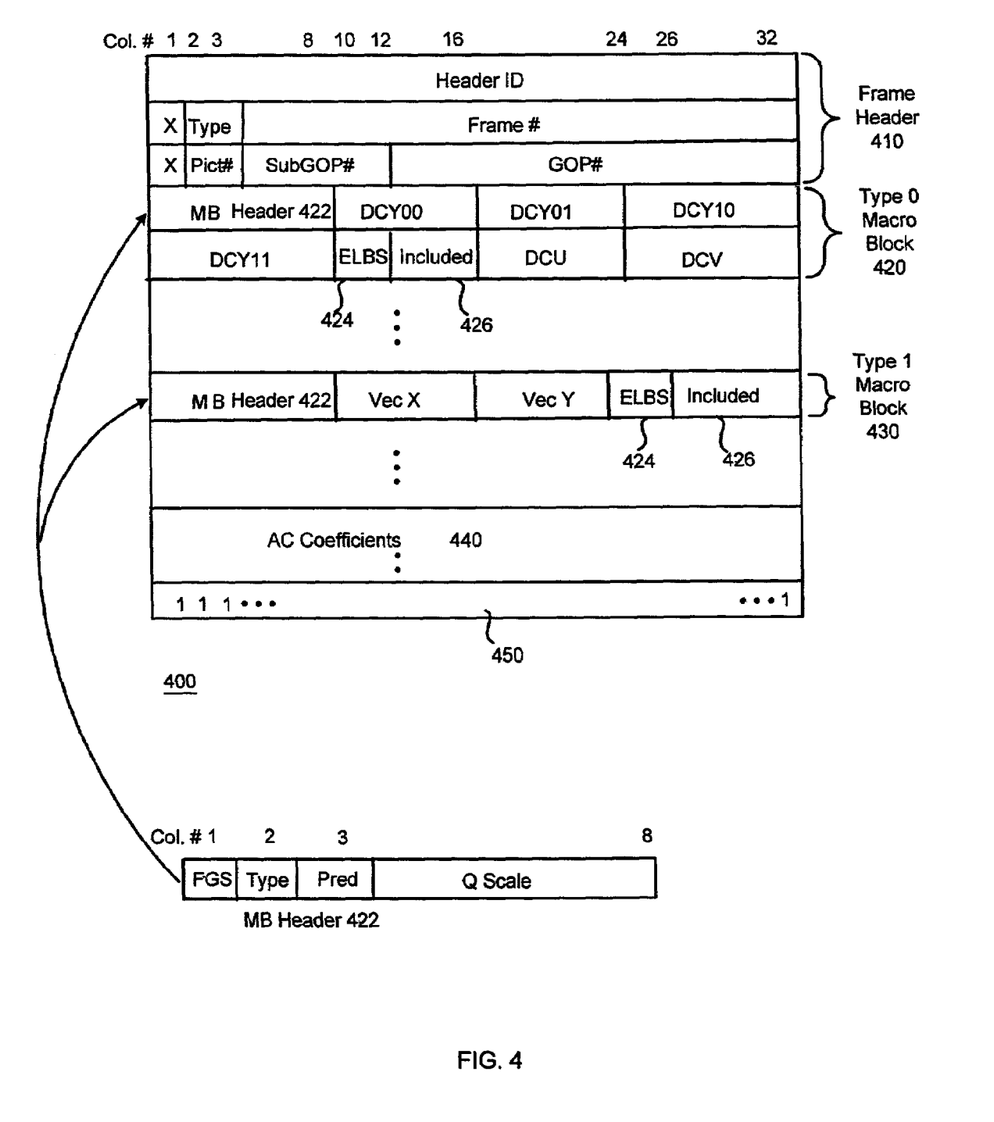
FIG. 4 illustrates a block diagram of one embodiment of the data format in accordance with the present invention.

In accordance with the present invention, FIG. 4 illustrates one embodiment of the format for the intermediate video data stream that enables the output compressed video data to be compatible with the multiple video compression formats. The format of a frame pack in the transitional video data stream is shown in a general 32-bit aligned form. The transitional video data stream comprises a sequence of frame packs, each of which includes a sequence of macro blocks.

The first section of a frame pack is the frame header 410 which includes information such as a header ID, serial numbers of the frame, the group of pictures (gop), the sub-gop and the picture within the group, the type of frame, and a marker that serves to round up the 32-bit word length. One skilled in the art will understand the functions of the header information from the context of the referencing and will recognize that different variations can be made in the header format white maintaining a similar function. The frame pack comprises macro block packets, which are discussed below.

A macro block is one type of data associated with a video data stream. Video compression processors, including core compression processor 322 and encoder 324 illustrated in FIG. 3, generally operate with data in the form of macro blocks. A macro block corresponds to a 16×16 pixel block, thus a frame supporting 640×480 resolution can be described by 40×30, or 1,200 macro blocks, by way of example. The core compression processors receives the video pixel information and processes the macro block data in YUV form, which a person skilled in the art can readily recognize is one conventional way to represent the color space. There are four Y data blocks, generically designated 00, 01, 10 and 11, and a U and a V data block. Each data block corresponds to an 8×8 cell grid. After performing a DCT operation on the video data, 8×8 blocks of coefficients are generated. The more significant ones are called intra coded blocks (I blocks), where "intra" means no motion compensation is used on these blocks. Other coded blocks that utilize motion compensation are called non-intra blocks (residual blocks). Accordingly, there are two types of macro block packets. The upper-left corner coefficient of an I block is called a direct current (DC) coefficient, which represents the average of all the pre-DCT values in the 8×8 cell grids. All the other coefficients are called alternate current (AC) coefficients because they represent a frequency component involving an alternating waveform. Only DC coefficients, which are the zero frequency terms, are automatically included in the macro block data packet corresponding to the macro block.

A macro block data packet 420, 430, whichever its type, includes an 8-bit header 422 with encoding parameters such as type and quantization scale (Qscale) used to form an output macro block header for each macro block of the transitional video data stream, and flags indicating whether or not FGS applies and whether the macro block corresponds to previous or post prediction. A person skilled in the art will recognize that "FGS" is an option provided by the MPEG-4 standard compression format which indicates the use of multi-bit rate streams in broadcasting. When FGS is enabled, an enhanced layer bit plane is also specified in the ELBP attribute 424. If the block is of the residual type, the predication flag indicates whether it corresponds to the forward or backward type. Another set of flags shown is in the 6-bit "Included" attribute 426. Each bit of the Included attribute 426 indicates whether the AC coefficient of one of the Y00, Y01, Y10, Y11, U and V 8×8 blocks are included at the end of the frame.

If the macro block packet represents an I block, as in packet 420, six DC values corresponding to six 8×8 quantized pixel data blocks, as processed by the core compression processor 322 and VLC encoder 324, are included. Otherwise, for a residual macro block, only two motion vectors are included in the packet. The AC coefficients 440 that are included in the frame pack are located after all the macro block packets. A complete 32-bit word packed with 1's serves as an end-of-frame-pack indicator 450.

One aspect in accordance with the present invention includes the use of 32-bit aligned data in the transitional video data stream for data transfer between the video processing system 310 and the external host device 350. Generally, a bit stream does not need aligned data. The use of aligned data, however, facilitates the decoding process. Conventional video compression schemes typically employ an 8-bit aligned data stream. The aligned data enables an easier search for specific data frames or macro blocks since a word-by-word search can be used instead of a bit-by-bit search. However, a penalty is inherent because data bits are not always produced in units with rounded numbers. Hence, if an 8-bit aligned data structure is adopted, there is potentially up to 7 bits being wasted in each frame pack. In other words, the overall compression ratio suffers.

The use of 32-bit data in transitional video data stream in accordance with the present invention is an optimal design based on the present generation of computer hardware technology. The fact that DRAM and most PC processors employ 32-bit words makes it simpler to design hardware that work efficiently with the transitional video data stream. It should be readily apparent to one skilled in the art that a different data alignment may be used beneficially in a different situation or as a result of the evolution of computing technologies.

An Application of the Present Invention

In accordance with the present invention, a video compression scheme is proposed which affords the user the options to choose one of many video compression formats, including the widely-used standard video formats such as MPEG-1, MPEG-2, MPEG-4 and H.263. An implementation of the scheme in a hardware-software combination is discussed, particularly with reference to system 300 of FIG. 3. An embodiment of a 32-bit aligned transitional data format suitably used by the present invention, as illustrated in FIG. 4, is also described.

Figure 5:
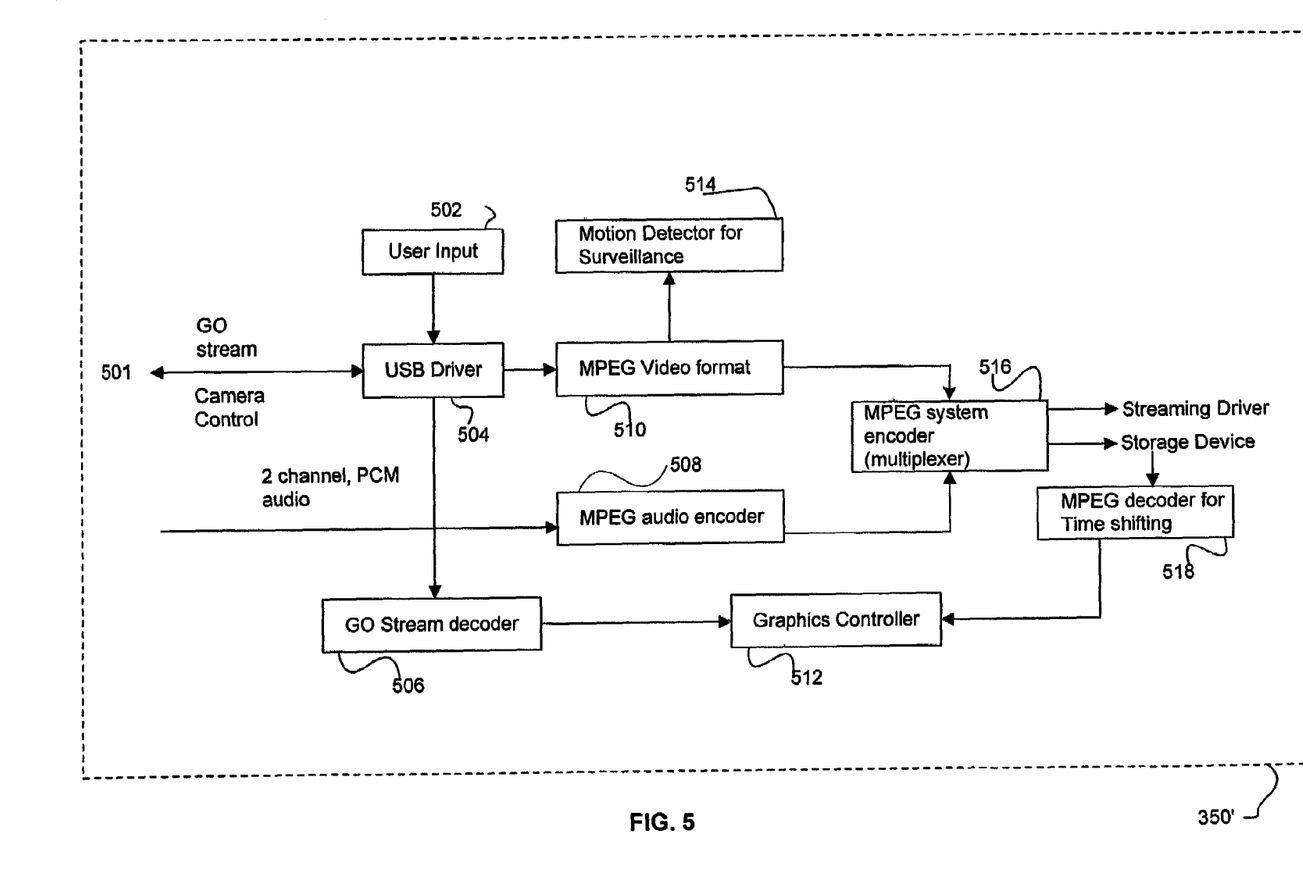
FIG. 5 is a block diagram illustrating one embodiment of the host device of FIG. 3.

Exemplary applications suitable for the implementation of the present invention include digital video recorders, remote video surveillance systems, video capture boxes, small portable handheld devices such as digital cameras, multimedia-enabled cellular phones and PDAs, and other media-based devices and appliances. FIG. 5 illustrates a block diagram of one application of a host device 350' in accordance with the present invention that can be used as a video surveillance systems.

In FIG. 5, the transitional video data stream 501 is received by a USB driver 504, which also receive input commands from the user 502. The driver 504 then forwards the stream 501 to a decoder 506 and a transcoder 510. The decoder 506 performs decoding of the encoded data stream and forwards the video data to a graphics controller 512 for various applications, like displaying the video images. When the transitional data 501 is provided to transcoder 510, a particular output format like MPEG can be derived and combined with audio data received by 508 through encoder 516. The output of transcoder 510 may be received by a motion detector 514 that provides surveillance operations. The output of encoder 516 can be the streaming output data, or alternatively may be provided to a time shifting device 518. Device 518 may store video data for later usage, and by way of example, may function like a digital video recorder (DVR). The output of device 518 can be provided to graphics controller 512 for various applications. It should be readily apparent to a person with ordinary skill in the art that this example is a simplification in many aspects, but is nevertheless an illustration of how the present invention can be utilized. Note, in particular, that the transitional video data stream is itself a usable video compression format, and can be decoded directly, in decoder 506 in this example, for a variety of applications.

In general, although the invention has been described in considerable detail with reference to certain embodiments, other embodiments are possible. As will be understood by those of skill in the art, the invention may be embodied in other specific forms without departing from the essential characteristics thereof. Accordingly, the present invention is intended to embrace all such alternatives, modifications and variations as fall within the spirit and scope of the appended claims and equivalents.

What is claimed is:

1. A method for performing compression of video data according to multiple video formats, the method comprising:
    receiving video data;
    performing core compression on the video data received, the core compression including a core compression substep required by multiple formats of video compression; and
    encoding the video data that is core-compressed to produce a transitional data stream, the transitional data stream preserving substantial raw information associated with the video data and ready to be transcoded into an output video stream compatible with any one of the multiple video formats.

2. The method of claim 1, wherein the video data received is a CCIR 601 bit stream.

3. The method of claim 1, wherein the video data received is a CCIR 656 bit stream.

4. The method of claim 1, wherein the video data received is in a YUV 4:2:2 interlace bit stream.

5. The method of claim 1, wherein the multiple video formats includes the MPEG-1 format.

6. The method of claim 1, wherein the multiple video formats includes the MPEG-2 format.

7. The method of claim 1, wherein the multiple video formats includes the MPEG-4 format.

8. The method of claim 1, wherein the multiple video formats includes the H.263 format.

9. The method of claim 1, wherein performing core compression on the video data received comprises:
    performing motion estimation and compensation processing on the video data received;
    performing discrete cosine transformation on the video data compensated; and
    quantizing the video data transformed.

10. The method of claim 1, wherein performing core compression on the video data received further comprises:
    preserving in the video data that is core-compressed said information included in the transitional data stream.

11. The method of claim 1, wherein the transitional data stream comprises:
    a plurality of 32-bit aligned macro block packets.

12. The method of claim 1, further comprising:
    transmitting the transitional data stream to a host device; and
    in the host device, transcoding the transitional data stream into the output video stream.

13. The method of claim 12, wherein the host device is a personal computer.

14. The method of claim 12, wherein the host device is a mobile phone.

15. The method of claim 12, wherein the host device is a IP based remote video surveillance system.

16. The method of claim 12, wherein the host device is a video capture box for time shifting purposes.

17. The method of claim 12, wherein transmitting the transitional data stream to the host device further comprises:
responsive to a data bus becoming available, transmitting the transitional data stream to a driver interface along the data bus, the data bus being communicatively coupled to the host device.

18. The method of claim 17, further comprising:
the driver interface receiving the transmitted transitional data stream;
storing the transitional data stream received by the driver interface in a buffer; and
responsive to the transitional data stream forming a complete frame pack in the buffer, transmitting the frame pack to a transcoder.

19. The method of claim 12, wherein transcoding the transitional data stream into the output video stream comprises:
decoding the transitional data stream into the video data that is core-compressed; and
encoding the video data that is decoded into the output video stream.

20. The method of claim 1, further comprising:
storing the transitional data stream.

21. A system for performing compression of video data according to multiple video formats, the system comprising:
a core compression processor for receiving input video data and performing core compression on the input video data received, the core compression including a core compression substep required by multiple formats of video compression; and
an encoder, communicatively coupled to the core compression processor, for encoding the video data that is core-compressed to produce a transitional data stream, the transitional data stream preserving substantial raw information associated with the video data and ready to be transcoded into an output video stream compatible with any one of the multiple video formats.

22. The system of claim 21, further comprising:
a streaming controller, communicatively coupled to the encoder, for transmitting the transitional data stream to a host device; and
a transcoder, communicatively coupled to the streaming controller and adapted to transcode the transitional data stream into the output video stream.

23. The system of claim 22, wherein the core compression processor, the encoder and the streaming controller are integrated in an ASIC.

24. The system of claim 21, wherein the transcoder comprises a general purpose computing platform running a transcoding computer program product.

25. The system of claim 22, wherein the streaming controller further comprises:
a driver interface, communicatively coupled to the encoder and to the transcoder, for transmitting the transitional data stream from the encoder to the transcoder.

26. The system of claim 25, wherein the streaming controller further comprises:
a memory device, communicatively coupled to the driver interface, for buffering the transitional data stream received by the driver interface.

27. The system of claim 26, wherein the driver interface transmits the transitional data stream from the memory device to the transcoder in response to the transitional data stream buffered in the memory device representing a complete frame pack.

28. A system for performing compression of video data according to multiple video formats, the system comprising:
means for receiving input video data;
coupled to the means for receiving, means for performing core compression on the video data received, the core compression including a core compression substep required by multiple formats of video compression; and
means for encoding the video data that is core-compressed to produce a transitional data stream, the transitional data stream preserving substantial raw information associated with the video data and ready to be transcoded into an output video stream compatible with any one of the multiple video formats.

29. The system of claim 28, further comprising:
means for transmitting the transitional data stream to a host device; and
means for transcoding the transitional data stream into a video stream compatible with any one of the multiple video formats.

30. A method for performing compression of video data according to multiple video formats, the method comprising:
receiving a transitional data stream, the transitional data stream preserving substantial raw information associated with the video data and ready to be transcoded into an output video stream compatible with any one of the multiple video formats;
decoding the transitional data stream received to produce compressed video data; and
encoding the compressed video data to generate the output video stream.

31. The method of claim 30, wherein the multiple video formats includes the MPEG-1 format.

32. The method of claim 30, wherein the multiple video formats includes the MPEG-2 format.

33. The method of claim 30, wherein the multiple video formats includes the MPEG-4 format.

34. The method of claim 30, wherein the multiple video formats includes the H.263 format.

35. The method of claim 30, wherein the transitional data stream comprises:
a plurality of 32-bit aligned macro block packets.

36. The method of claim 30, wherein decoding the transitional data stream received to produce compressed video data further comprises:
preserving in the compressed video data the information in the transitional data stream.

37. A system for performing compression of video data according to multiple video formats, the system comprising:
a driver interface for receiving a transitional data stream, the transitional data stream preserving substantial raw information associated with the video data and ready to be transcoded into an output video stream compatible with any one of the multiple video formats;
a decoder, communicatively coupled to the driver interface, for decoding the transitional data stream received to produce compressed video data; and
a multiple-format encoder, communicatively coupled with the decoder, for encoding the compressed video data to generate the output video stream.

38. The system of claim 37, further comprising:
a memory device, communicatively coupled to the driver interface, for buffering the transitional data stream received by the driver interface.

39. The system of claim 38, wherein the driver interface transmits the transitional data stream from the memory device to a transcoder in response to the transitional data stream buffered in the memory device representing a complete frame pack.

40. A system for performing compression of video data according to multiple video formats, the method comprising:
   means for receiving a transitional data stream, the transitional data stream preserving substantial raw information associated with the video data and ready to be transcoded into an output video stream compatible with any one of a plurality of video formats;
   means for decoding the transitional data stream received to produce compressed video data; and
   means for encoding the compressed video data to generate the output video streams.

41. A computer program product for performing compression of video data according to multiple video formats, the program product comprising:
   a computer usable medium;
   program codes for decoding a transitional data stream received at a driver interface to produce compressed video data, the transitional data stream preserving substantial raw information associated with the video data and ready to be transcoded into an output video stream compatible with any one of the multiple video formats;
   program codes for utilizing the information included in the compressed video data to encode the compressed video data into one or more video streams compatible with the multiple video formats.

42. The computer program product of claim 41, further comprising:
   program codes for buffering the transitional data stream received by the driver interface in a memory device communicatively coupled to the driver interface; and
   program codes for transmitting the transitional data stream from the memory device to the transcoder in response to the transitional data stream buffered in the memory device representing a complete frame pack.

43. A video processing system, comprising:
   a core compressor, the core compressor capable of performing a core compression substep required by multiple formats of video compression;
   coupled to the core compressor, a streaming controller; and
   coupled to the streaming controller, a video stream transcoder.

44. The video processing system of claim 43, wherein the core compressor comprises:
   a core compression processor; and
   coupled to the core compression processor, an encoder.

45. The video processing system of claim 43, wherein the video stream transcoder comprises:
   a decoder; and
   coupled to the decoder, a multiple-format encoder.

* * * * *